US010642881B2

(12) United States Patent
Singh et al.

(10) Patent No.: US 10,642,881 B2
(45) Date of Patent: May 5, 2020

(54) SYSTEM ARCHITECTURE FOR UNIVERSAL EMOTIVE AUTOGRAPHY

(71) Applicant: Intel Corporation, Santa Clara, CA (US)

(72) Inventors: Sudhir K. Singh, San Jose, CA (US); Abhishek Narain, San Jose, CA (US); Jose M. Rodriguez, San Jose, CA (US); Prasad Modali, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 796 days.

(21) Appl. No.: 15/199,248

(22) Filed: Jun. 30, 2016

(65) Prior Publication Data

US 2018/0004735 A1 Jan. 4, 2018

(51) Int. Cl.
*G06F 16/435* (2019.01)
*G06F 16/28* (2019.01)

(52) U.S. Cl.
CPC .......... *G06F 16/435* (2019.01); *G06F 16/285* (2019.01)

(58) Field of Classification Search
CPC .............................. G06F 16/435; G06F 16/285
See application file for complete search history.

(56) References Cited

U.S. PATENT DOCUMENTS

| | | | | |
|---|---|---|---|---|
| 8,005,841 B1 * | 8/2011 | Walsh | ...................... | G06F 16/78 707/739 |
| 8,356,035 B1 * | 1/2013 | Baluja | ................... | G06F 16/583 707/741 |
| 8,484,311 B2 * | 7/2013 | Svendsen | .............. | G06F 16/435 709/217 |
| 8,719,248 B2 * | 5/2014 | Mukhopadhyay | ...... | G06F 16/48 707/706 |
| 8,903,834 B2 * | 12/2014 | Ciancutti | .............. | G06F 16/907 707/748 |
| 9,031,951 B1 * | 5/2015 | Baluja | ................... | G06F 16/437 707/737 |
| 9,275,054 B2 * | 3/2016 | Paul | ......................... | H04N 5/76 |
| 10,147,129 B1 * | 12/2018 | Shang | ................ | G06Q 30/0631 |
| 2007/0271287 A1 * | 11/2007 | Acharya | ............... | G06F 16/285 |
| 2008/0306995 A1 * | 12/2008 | Newell | ................ | G11B 27/034 |
| 2009/0265417 A1 * | 10/2009 | Svendsen | ................ | G06F 16/48 709/203 |
| 2011/0213784 A1 * | 9/2011 | Udupa | .................... | G06F 16/30 707/747 |
| 2012/0102033 A1 * | 4/2012 | Sarshar | ................... | G06F 16/40 707/737 |

(Continued)

*Primary Examiner* — Huawen A Peng
(74) *Attorney, Agent, or Firm* — International IP Law Group, P.L.L.C.

(57) ABSTRACT

A method of emotive autography includes calculating a plurality of classifiers associated with an individual user. Each of the classifiers indicates a preference of the user for an associated type of multimedia content. Multimedia data is received including video data, audio data and/or image data. The multimedia data is divided into semantically similar segments. A respective preference score is assigned to each of the semantically similar segments by use of the classifiers. The semantically similar segments are arranged in a sequential order dependent upon the preference scores. An emotive autograph is presented based on the semantically similar segments arranged in the sequential order.

25 Claims, 8 Drawing Sheets

(56) References Cited

U.S. PATENT DOCUMENTS

| | | | |
|---|---|---|---|
| 2012/0158713 A1* | 6/2012 | Jin | G06F 16/435 707/728 |
| 2013/0097282 A1* | 4/2013 | Svendsen | G11B 27/00 709/217 |
| 2015/0370331 A1* | 12/2015 | Gonzales, Jr. | G06F 3/013 345/156 |
| 2017/0180443 A1* | 6/2017 | Raichelgauz | H04L 65/601 |

* cited by examiner

SYSTEM ARCHITECTURE FOR UNIVERSAL EMOTIVE AUTOGRAPHY

BACKGROUND ART

Emotive autography is the practice of combining different types and modes of information such as images, sound, and video to create content with a strong emotional component that reflects the content creator and/or content consumer's preferences. For example, a set of videos and images taken by a user during a holiday trip involving landmarks, beaches, and extreme sports can be intelligently combined or summarized to produce a movie that emphasizes her preference for beaches, or that emphasizes a preference (say, extreme sports) of the person(s) she wants to share it with. In some cases, there is no practical way to tailor such movies to the preferences of an individual viewer because the same content understanding engine is used for all the users to determine their preferences as a group.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
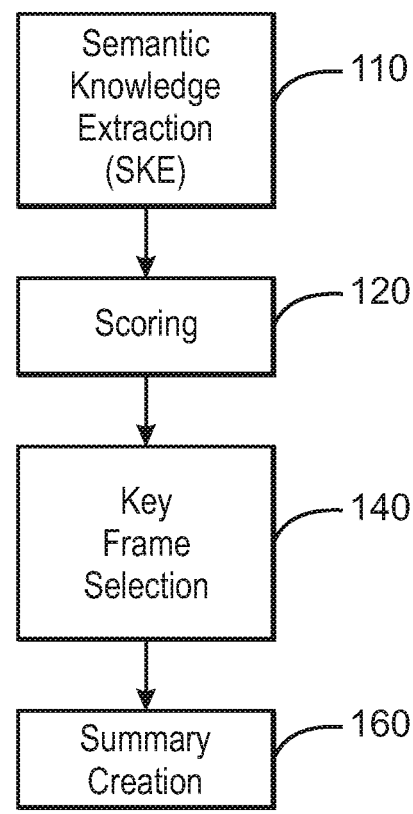
FIG. 1 is a flow chart of a video summarization method.

The present techniques relate generally to emotive autography based upon inputs from a user. Embodiments described herein enables emotive autography where a plurality of classifiers associated with an individual user are calculated. Each of the classifiers can indicate a preference of its respective user for an associated type of content. The data may be received, where the data includes video data, audio data, image data, other sensory data such as activity log from a wearable bio-sensor, and/or any combination thereof. The data may be divided into semantically similar segments, and a respective preference score is assigned to each of the semantically similar segments by use of the user specific classifiers. The semantically similar segments may be arranged in a sequential order according to the preference scores, and an emotive autograph may be presented based on the semantically similar segments arranged in the sequential order.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is an illustration of a method 100 for video summarization. In embodiments, video summarization is one of the usages that Emotive Autography enables. Video or audio frames are analyzed and understood using a set of classifiers that remains the same across users and over time (referred to as Semantic Knowledge Extractor/SKE; block 110). A bag of visual/aural/kinetic or multimodal classifiers may be used to understand frames or sets of frames.

At block 120, these subsampled key frames are scored based on SKE output, combined possibly with inertial measurement unit (IMU) sensor outputs and certain interestingness/relevance parameters that may or may not be user specific.

At block 140, a subset of top scored frames satisfying certain constraints are selected. Key frames are selected based on the above scores and certain constraints such as desired video length and conceptual smoothness (e.g., lack of abrupt changes) of the summarized video.

At block 160, the key frames are blended, and external content such as background music may be added, to create a summary.

In embodiments, the present techniques fundamentally tie block 110 of FIG. 1 to block 120 and make the whole framework user-centric. Users' preferences are fundamentally designed into the framework. The classifiers used to understand the video and audio frames are not generic in this case and are built specifically for the particular user. This significantly improves the accuracy of the classifiers and thereby the relevance of the selected key frames. In embodiments, reducing the number of classes improves the accuracy of the classifier.

Figure 2:
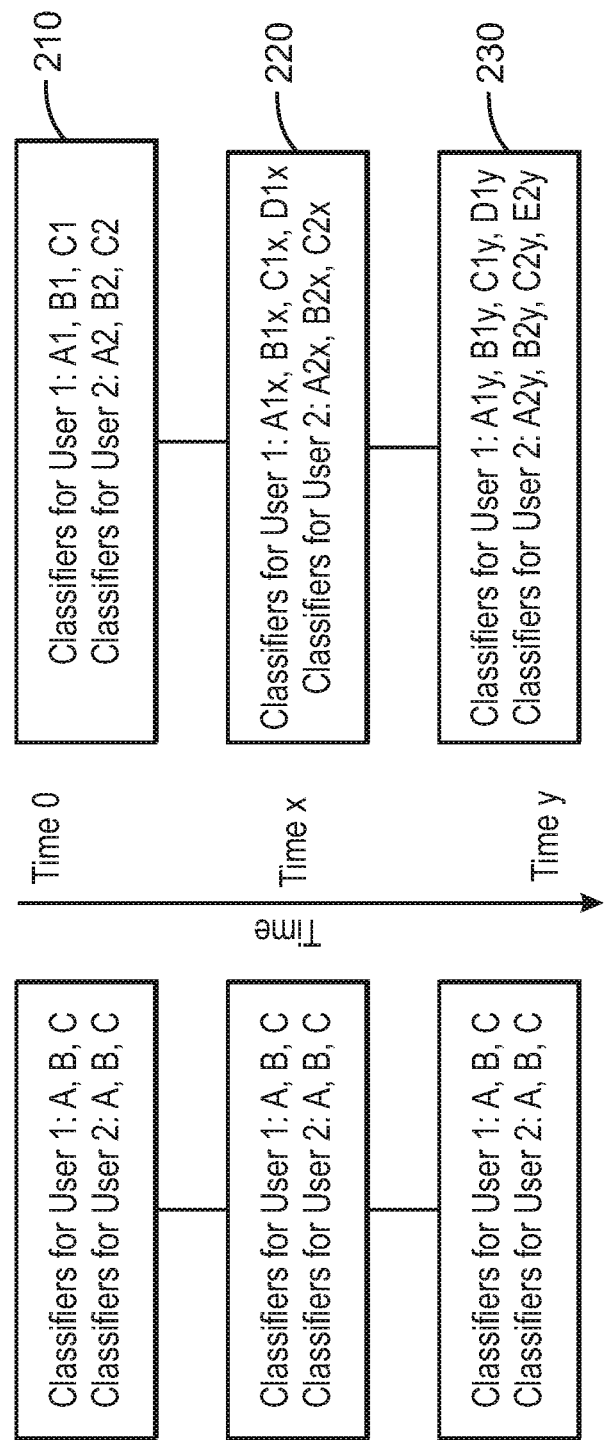
FIG. 2 is an illustration of a distinction between emotive autography and existing video summarization techniques.

The present techniques are evolved with regard to the semantic knowledge extraction (SKE). Specifically, the approach of the present techniques is inherently dynamic and evolves to a better summary over time as the frame-understanding piece (SKE) adapts and improves over time. Classifiers adapt to the user and improve over time. FIG. 2 is an illustration of a distinction between emotive autography and existing video summarization techniques. FIG. 2 includes a plurality of classifiers 200. As illustrated in FIG. 2, user 1's initial classifiers A1, B1, C1 (block 210) evolve to more accurate classifiers A1$x$, B1$x$, C1$x$ (block 220) at time x, and a new classifier D1$x$ is introduced to capture new types of video that user 1 captured by this time x. Classifiers A1$x$, B1$x$, C1$x$, D1$x$ evolve to more accurate classifiers A1$y$, B1$y$, C1$y$, D1$y$ (block 230) at time y. User 2's initial classifiers A2, B2, C2 evolve to more accurate classifiers A2$x$, B2$x$, C2$x$ at time x, and evolve to even more accurate classifiers A2$y$, B2$y$, C2$y$ at time y. A new classifier E2$y$ is introduced to capture new types of video that user 2 captured by this time y. In contrast, in the prior art methods, the classifiers for both user 1 and user 2 are the same and remain frozen or constant across time. In addition to the above-described features, the present disclosure may provide a user feedback mechanism which alleviates the need for training data collection.

In embodiments, the classifiers are adaptive. As described herein, adaptive classifiers are classifiers that are dynamic and can change over time. As illustrated by FIG. 2, the classifiers are designed for the particular users, and the classifiers evolve or are trained over time. By contrast, traditional classifiers are frozen or constant. The present techniques also enable a system architecture for universal user-centric emotive autography which enforces the emotional component to reflect the content creator and/or content consumer's preferences. For example, a set of videos and images taken by a user during a holiday trip involving landmarks, beaches, and extreme sports can be summarized to produce a movie that emphasizes her preference for beaches, or that emphasizes a preference (e.g., extreme sports) of the person(s) she wants to share the movie with. This approach can also be seen as preference-centric. In the following, a channel may refer to a class name of a set of semantically similar signals such as objects, scenes, events, activities. Therefore, channel classifier means a classifier for such a class of objects, scenes, events or activities respectively. The system may adaptively build channel classifiers specific to a user. In this manner, scalability of channel classification is achieved by aggregating custom classifiers across users. The present disclosure may employ negative channels to exclude signals that are uninteresting to a user.

In embodiments, training data is prepared on the fly such that a prior set of training data (labeled or unlabeled) is not necessary. A metric referred to as combinatorial edit entropy may be employed for measuring the semantic similarity of signals. Moreover, the present techniques may be directed to unsupervised, automatic or computer-implemented clustering of images, audios, videos, combination thereof, and other signals (e.g., from a gyroscope, heartbeat monitor, or accelerometer) by semantic similarity to thereby discover channels of the user's interests (e.g., objects, scenes, events), called ME channels, and adaptively learn classifiers for these channels. Instead of using an imprecise classifier for large set of object/scene classes, user preference based sets of precise classifiers are built for a much smaller set of object/scene classes per user, while collecting training data on the fly. This reduces the number of classes, thereby significantly improving the accuracy of the classifiers for any given user.

The learned channel classifiers for the user are used to create an autograph from one or more sets of signals that the user has. Further, the autograph can also be created based on a second user(s) (e.g., the actual consumer of the autograph) by using the second user's set of channel classifiers. A combinatorial metric to measure semantic similarity is also included in the present techniques.

In a concept discovery step, given a set of signals (e.g., videos, images, and audio) from a user, the signals are segmented and clustered into clusters of semantically similar signals. In one embodiment, the segments are represented as a probability distribution over bag of words (e.g., textual, visual, aural) and as a node of a graph. An edge weight between two nodes is the combinatorial edit entropy (defined below) of the probability distribution representing the second node given the first node. A graph partitioning algorithm minimizes an average set distance of nodes within a cluster while maximizing the distance from all nodes outside the cluster, and is used for clustering. Each node may represent the content of all or a portion of an image file, video file, audio file, or any of the signals (e.g., heartbeat, thermal image), for example.

In general, the clustering can be done based on visual features/descriptors such as histogram of oriented gradients (HOG), scale-invariant feature transform (SIFT), speeded up robust features (SURF), GIST, aural features/descriptors such as mel-frequency cepstral coefficients (MFCC), or features/descriptors learned using neural networks, and suitable distance metrics such as Euclidean distance or Edit distance using suitable clustering algorithms such as k-means, k-medoids or graph-partitioning. A generic object/scene classifier trained for large number of classes (possibly inaccurate) may also be used optionally during the clustering step. This step produces a set of clusters for a user. Each cluster may be referred to as an ME channel for the user and may correspond to an object, scene, event or another meaningful set of semantically similar signals.

In a concept selection step, the user annotates her ME channels with semantically meaningful tags and optionally indicates whether she likes certain ME channels, and whether she dislikes certain channels. If the system has prior information about user preferences (e.g., from the user's activity on Facebook/Instagram/Pinterest/Youtube, etc.), that information may be used instead of, or in addition to, this interactive step. This step produces a set of "important"

ME channels for a user with respective importance scores as well as a set of negative channels to impose exclusion of certain signals.

In a selective supervised training step, a set of classifiers are trained for each of the "important" ME channels as well as for negative channels discovered in the concept selection stage. The training data for this purpose comes from the tagging of the clusters in the concept selection stage. Alternatively, the training data may come from the cloud (e.g., an external training database). The supervised learning schemes to train these classifiers could be based on support vector machines, nearest neighbors, neural networks etc. This step may produce a set of updated classifiers for the user for each of her important ME channels and negative channels. These classifiers specific to a user may be trained for small number of classes (e.g., less than fifty classes).

In an emotive autograph generation step, when a new signal or set of signals (e.g., a new video or a set of videos) arrive for a user, it is segmented, optionally clustered, and each segment (cluster) is classified using the channel classifiers for that user (important ME channel classifiers as well as negative channel classifiers) and is assigned a score based on the user's importance score for the channels as well as the channel classifiers' confidence scores. Alternatively, the channel classifiers for the intended consumer of the emotive autograph can be used instead of, or in addition to, the user's channel classifiers. Any segment classified as a negative channel is assigned a lower score. Using these scores, a set of top segments are selected. A temporal sequencer makes sure there is a time ordering to the signals in these segments. The blender utilizes this time ordering and a stitching algorithm to create an emotive autograph out of the signals in these top segments. One value of the vector may represent the time at which the other values of the vector were in effect. Optionally, the user tags the segments and assigns an importance score which in turn can be used to augment the training data and relearn the channel classifiers (or add classifiers for new channels). Additionally, the blending step may involve the user in the stitching process wherein the user arranges some of the segments. The system may use a machine learning algorithm to learn the user's stitching preferences to be used in the blending step in future autography sessions. The signals may not necessarily be contiguous.

In a collective channel intelligence and emotive exploration step, the user-centric channel co-occurrence statistics may be combined across all the users and augment a user's importance score beyond her own using this collective information. This essentially speeds up learning for a user by using knowledge from other users. Let us define collaborative similarity between two channels as the normalized value across the set of all users of how often the two channels fall into the "important ME channels/negative channels of a user with close enough importance scores". For each channel, then there is a set of other channels that are close to the channel with respect to this similarity score. In autograph generation stage, a new autograph creation from a set of signals then also uses these additional similar channels and additional similar exclusion channels. This may be referred to as emotive exploration.

In the present techniques, a metric for semantic similarity is also developed, referred to as combinatorial edit entropy. Signal features/descriptors may not necessarily lie in a Euclidean space. For example, consider a three-dimension color space with basis elements {Blue, Pale Blue, Red}. These three basis elements are not orthogonal to one another. Consider three vectors in this space representing three respective signals: V1=[1.0, 0, 0], V2=[0.5, 0.5, 0], V3=[0.5, 0, 0.5]. As per Euclidean distance, V1 is at a same distance from V2 as from V3. However, intuitively, V1 should be more similar to V2 than V3 as Blue is closer to Pale Blue than to Red. To capture such a notion of similarity in a non-Euclidean space, the present techniques provide this as the metric combinatorial edit entropy.

Given two discrete probability distributions P and Q on a space S, combinatorial edit entropy is defined as $D_{CEE}(P\|Q)$ of P given Q as the output of the following combinatorial algorithm:

Input: (i) a probability space S and a distance metric M: $S \times S \rightarrow R^+$, essentially an outcome disparity matrix, e.g., for each pair of outcomes (s, t) a cost of observing t instead of s; and (ii) two discrete probability distributions P and Q on S.

Output: $D_{CEE}(P\|Q, M) \in [0, 1]$

In general, this output may represent the weight assigned to an edge between two nodes, and may range between zero and one, for example. This output may represent the similarity between the two nodes. As an example, an image node may be in the form of a vector with numerical values of the magnitude of each color component in the image (e.g., red, green, blue), and may have one or more additional numerical values that are associated with the image but that are not descriptive of the image itself, such as the heart rate of the user as she is viewing the image. In general, a vector may contain any number of variables associated with content, and the respective vectors of two nodes may be used to evaluate the similarity between the two nodes. For example, the vector may have a first variable value to describe the content of an image, video segment or audio segment as well as second variable value associated with the first variable value, such as the time of day, GPS data to describe the location of the content, and variable values that describe the state of the user's body at the time, such as heartbeat, the direction in which she is looking, the direction in which she is leaning, or other bodily movements.

Algorithm:
(i) Choose tolerance parameter $\delta \in E \, R^+$ and/or an integer $L \lesssim |S|$ and compute
$\delta_{s,L} \leftarrow |M(s,t_1) - M(s,t_L)|$
  Where $t_i$'s are defined such that
$M(s,t_1) \lesssim M(s,t_{12}) \lesssim \cdots M(s,t_i) \lesssim \cdots M(s,t_{|S|})$
$(\delta s,L \leftarrow \min (\delta, |M(s,t_1) - M(s,t_L)|)$ in case $\delta$ is provided directly
Also, $\eta_s \leftarrow t_1$
$m_{max} \leftarrow C * \max{}_{s \in S}, t_{\in S} M(s, t)$ for a predefined constant $C > 1$
(ii) $D \leftarrow 0$;
Repeat the following until $\|Q\|_1 = 0$.
$u \leftarrow \arg \max{}_{s \in S} Q(s)$
$v \leftarrow \arg \max{}_{s \in S} \{ P(s) : |M(u, s) - M(u, \eta_u)| < \delta_{u,L} \}$
$m_{v,u} \leftarrow \min \{Q(u), P(v)\}$
if $m_{v,u} > 0$

```
        Q(u) ← Q(u) - m_{v,u}
        P(v) ← P(v) - m_{v,u}
        D ← D + m_{v,u} * M(v, u)
    if m_{v,u} = 0
        D ← D + m_{max} * Q(u)
        Q(u) ← 0
    (iii) D ← (D + m_{max} * || P ||_1)/C
        output D
```

The tolerance parameter may specify the degree of similarity that values have in order to be in the same node.

With regard to dynamic versus static and repeatability requirements, the inventive emotive autography method is essentially dynamic and evolves due to on-the-fly training/learning versus a static method. This means that at equilibrium (e.g., after learning enough about the user), repeatability may be a requirement (i.e., getting the same autograph given a particular input). However, in the short term, repeatability is not guaranteed wherein a learning via another signal may happen in-between that may change the user's importance/preference scores. However, the autograph would arguably get better as the classifiers evolve.

In one embodiment, the user actively indicates her preferences, likes and dislikes, and these indications are used to create the emotive autography. For example, the user may be presented with five to ten images captured at approximately the same time and place, and the user may indicate which of the images are important, or that she likes or dislikes in terms of the content of the images. The user's indications may be included as variables in the node vectors.

Figure 3:
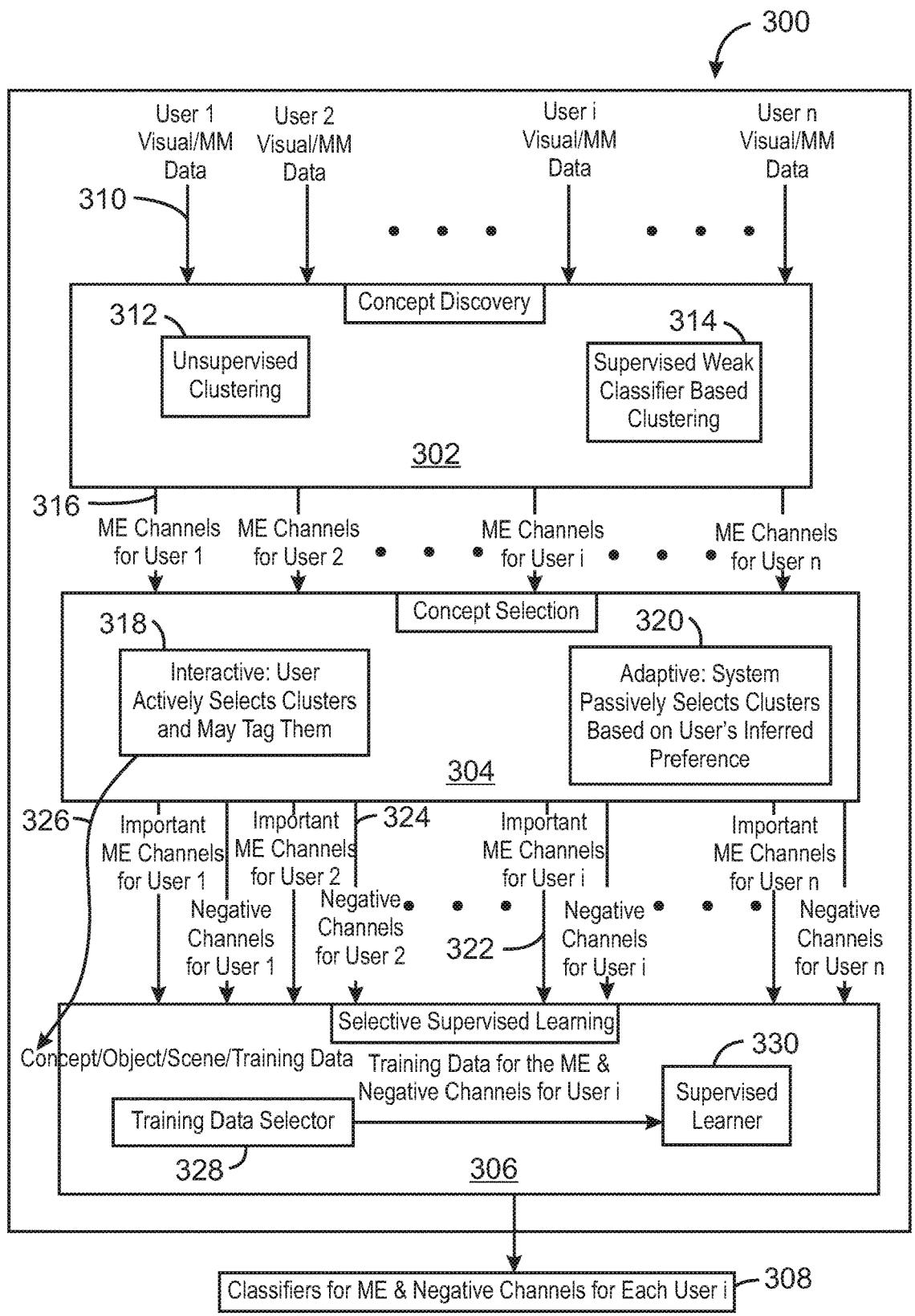
FIG. 3 is a block diagram of a universal emotive autography arrangement.

FIG. 3 is a block diagram of a universal emotive autography arrangement 300 of the present disclosure, including a concept discovery block 302, a concept selection block 304, a selective supervised learning block 306, and classifiers 308. Visual data and multimedia data signals 310 for each of n number of users is received by concept discovery block 302.

In concept discovery block 302, multimedia data signals 310 are segmented and clustered into clusters of semantically similar signals. The clustering may include unsupervised clustering 312 and/or supervised weak classifier based clustering 314.

In a concept selection block 304, clusters or ME channels 316 for each user are received from concept discovery block 302. In block 318, the user interactively selects or tags her clusters or ME channels with semantically meaningful tags and optionally indicates whether she likes or dislikes certain clusters or ME channels. If the system has prior information about user preferences (e.g., from the user's selections and "likes" on Internet websites), then in block 320 that information may be adaptively used instead of, or in addition to, the user interactive block 318. Accordingly, block 304 produces a set of "important" or liked ME channels 322 and a set of "negative" or unliked ME channels 324 for each user.

In a selective supervised learning block 306, a set of classifiers are trained for each of the liked channels and unliked channels. That is, liked ME channels 322 and unliked ME channels 324 are received for each user from concept selection block 304. The training data results from the tagging of the clusters in concept selection block 304. That is, as indicated at 326, the active selection of clusters by the user results in concept/object/scene/training data being received by a training data selector 328. Training data selector 328 may produce training data for all the ME and negative channels for the users, and this data may be used by supervised learner 330. It is also possible for the training data to be received from external sources on the Internet. Accordingly, selective supervised learning block 306 may produce a set of updated classifiers 308 for liked and unliked channels for each user.

Figure 4A:
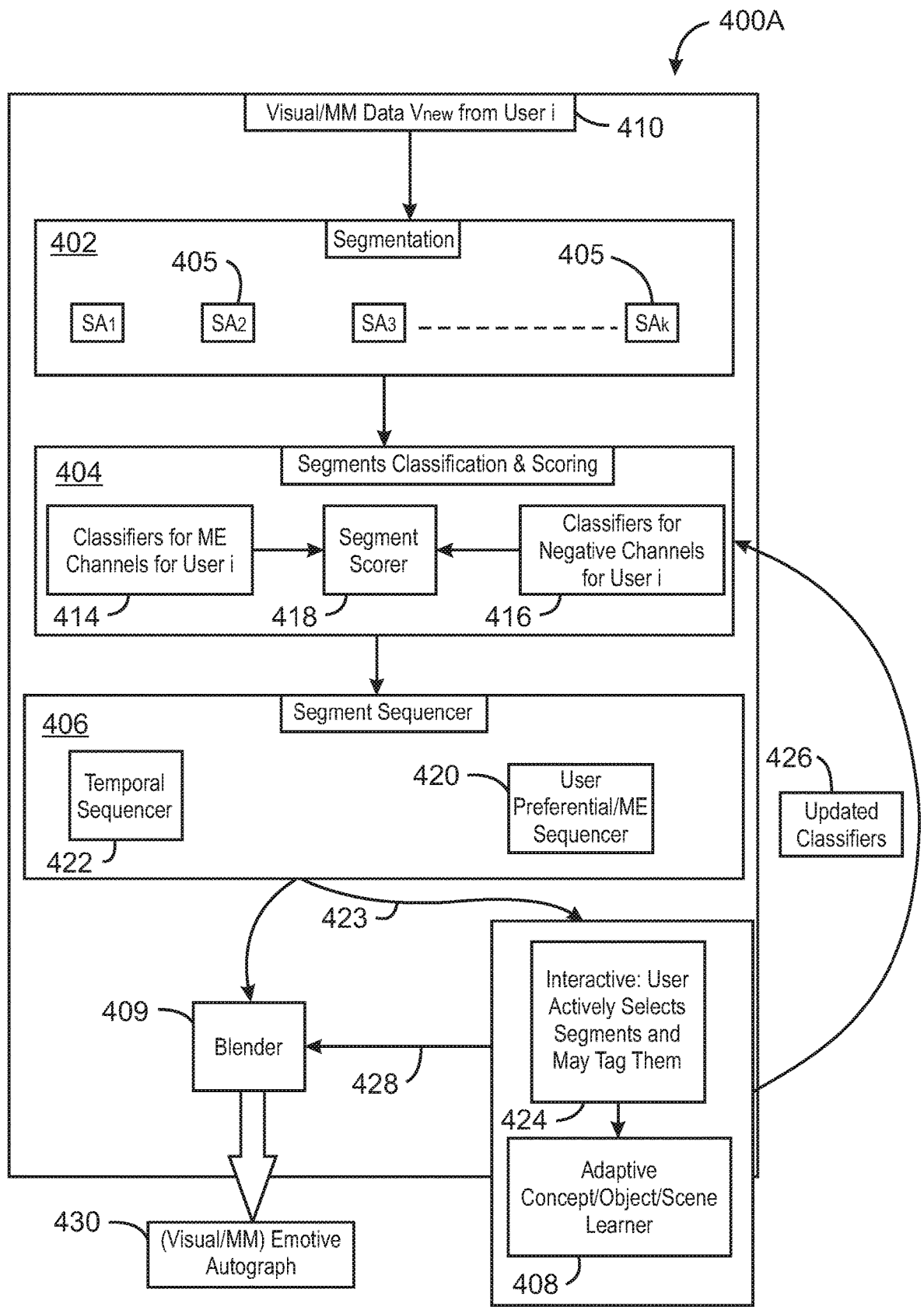
FIG. 4A is a block diagram of a universal emotive autography arrangement.

FIG. 4A is a block diagram of another embodiment of a universal emotive autography arrangement 400A of the present disclosure, including a segmentation block 402, a segments classification and scoring block 404, a segment sequencer block 406, an adaptive concept/object/scene learner 408, and a blender 409. Visual data and multimedia data signals 410 from a particular user i are received by segmentation block 402. Visual data and multimedia data signals 410 may be in the form of images, video and audio files that the user has captured, recorded, downloaded or otherwise received on her smartphone. However, it is also possible for signals 410 to be content that the user has not necessarily ever before seen or heard, such as online news content, motion pictures that may have been shown in movie theaters, or results of online searches for videos or images. The user may have conducted such searches, or the searches may have been performed automatically by the system. Signals 410 may also be content that the user's friends have on their smartphone or social media accounts that the user's friends have given the user access to.

In segmentation block 402, signals 410 are segmented and clustered into segments 405 of semantically similar signals. For example, segments 405 may be assigned one or more textual or alphanumeric tags, wherein each tag describes the content of the segments. The content may be described generally (e.g., indoor or outdoor), specifically (e.g., skydiving or baseball), or any degree of specificity in-between. The content of two signals may be semantically similar in a general sense (e.g., both content is directed to the outdoors), or may be semantically similar in a more specific sense (e.g., both content is directed to skydiving). Segments 405 may be represented as a node of a graph. The nodes of segments 405 that are more semantically similar may be closer to each other on the graph than are the nodes of segments 405 that are less semantically similar. A graph partitioning algorithm may be used for clustering segments 405 into clusters. Each segment 405 may represent the content of all or a portion of an image file, video file, audio file, or any of the signals (e.g., heartbeat, accelerometer), for example. A single video file, for example, may include different content in different time periods, and the segments may begin and end when the different content begins and ends. For example, a two-minute video may have indoor content in the first minute and outdoor content in the second minute, and thus the video may be divided into an indoor segment and an outdoor segment, each of one minute duration.

In segments classification and scoring block 404, segments 405 are classified and scored. Classifiers 414 for ME channels and classifiers 416 for negative channels for the user are applied to segments 405 by a segment scorer 418 to produce a corresponding score for each segment 405. The score may indicate how well the user would probably like, or be interested in, each segment 405.

Each segment 405 and its corresponding score may be received by segment sequencer block 406 from segments classification and scoring block 404. Using the scores, a user preferential/ME sequencer 420 selects a set of top segments 405. A temporal sequencer 422 provides the time ordering to the signals in segments 405.

The time-sequenced and preference-sequenced segments are received by and presented to the user, as indicated at 423, and the user may interactively select the segments and tag them, as indicated at 424. The segment selections and tags may be received by an adaptive concept/object/scene learner 408 which updates classifiers and transmits the updated classifiers 426 to blocks 414 and 416.

The time-sequenced and preference-sequenced segments are received by blender 409. Blender 409 also receives the segment selections and tags from the user, as indicated at 428. Blender 409 may use the time-sequenced and preference-sequenced segments to automatically create an emotive autograph 430 out of the signals in these segments. The blending may include automatic time sequencing of the segments, or the user may decide the time sequencing of the segments.

Certain components in FIGS. 3 and 4A have been labeled herein schematically as "blocks". However, it is to be understood that each of the blocks may be embodied in the form of physical electronic components, such as modules, circuits, etc.

Figure 4B:
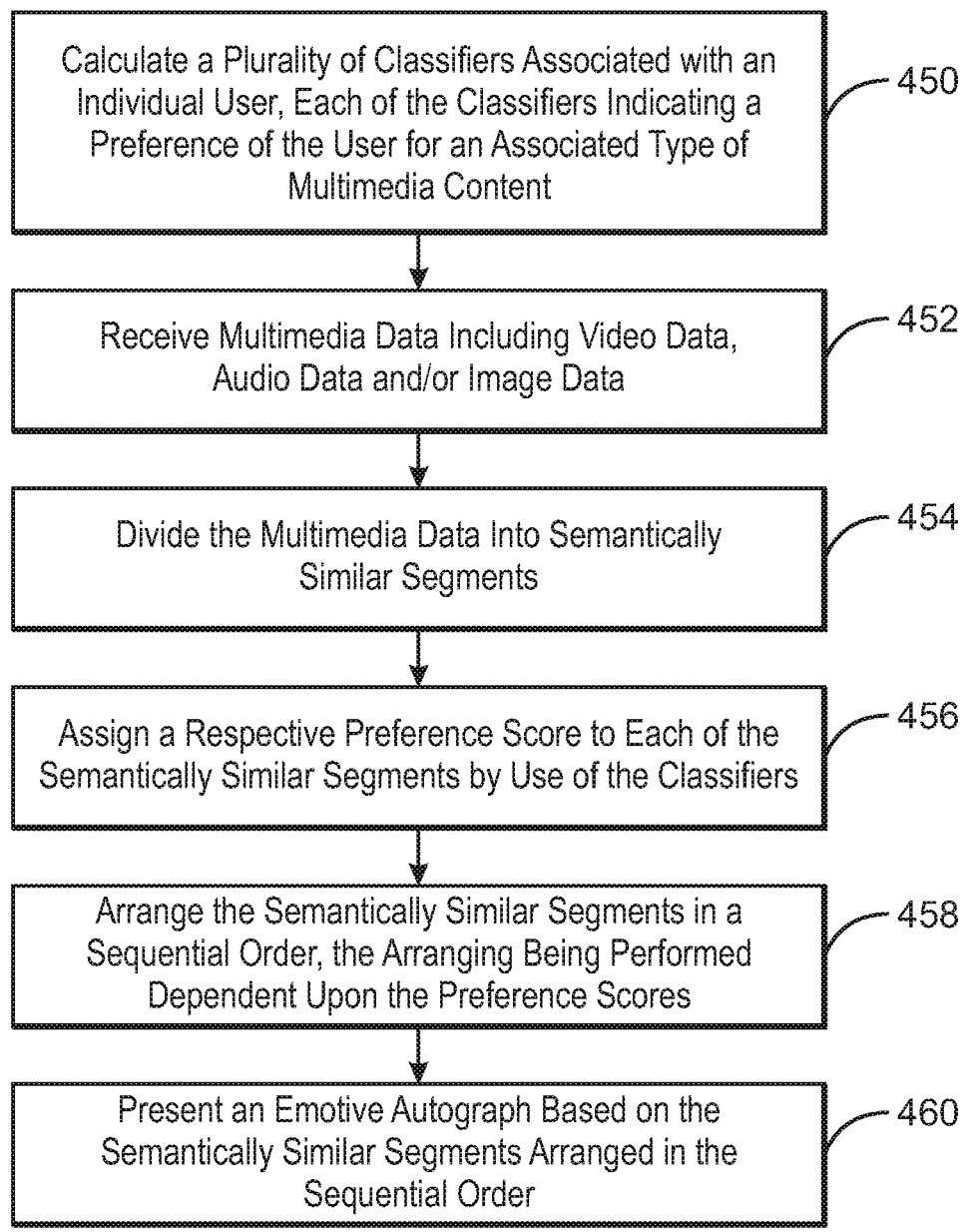
FIG. 4B is a process flow diagram of a method for performing emotive autography.

FIG. 4B is a process flow diagram of a method 400B for performing emotive autography. In a first block 450, a plurality of classifiers associated with an individual user are calculated. Each of the classifiers indicates a preference of the user for an associated type of multimedia content. For example, the use of convolutional neural networks is one known technique for calculating or constructing classifiers based upon previously received data associated with the individual user.

Multimedia data including video data, audio data and/or image data is received (block 452). That is, digitized video data, audio data and/or image data may be input to a universal user-centric emotive autography arrangement, such as those illustrated in FIGS. 3 and 4. For example, visual data and multimedia data signals 410 from a particular user may be received by segmentation block 402.

The multimedia data is divided into semantically similar segments (block 454). For example, in segmentation block 402, signals 410 are segmented and clustered into segments 405 of semantically similar signals.

A respective preference score is assigned to each of the semantically similar segments by use of the classifiers (block 456). For example, in segments classification and scoring block 404, segments 405 are classified and scored.

The semantically similar segments are arranged in a sequential order. The arranging is performed dependent upon the preference scores (block 458). For example, temporal sequencer 422 may provide the time ordering to the signals in segments 405.

An emotive autograph is presented based on the semantically similar segments arranged in the sequential order (block 460). For example, blender 409 may use the time-sequenced segments to automatically create an emotive autograph 430 out of the signals in these segments, and autograph 430 may be presented to the user.

Figure 5:
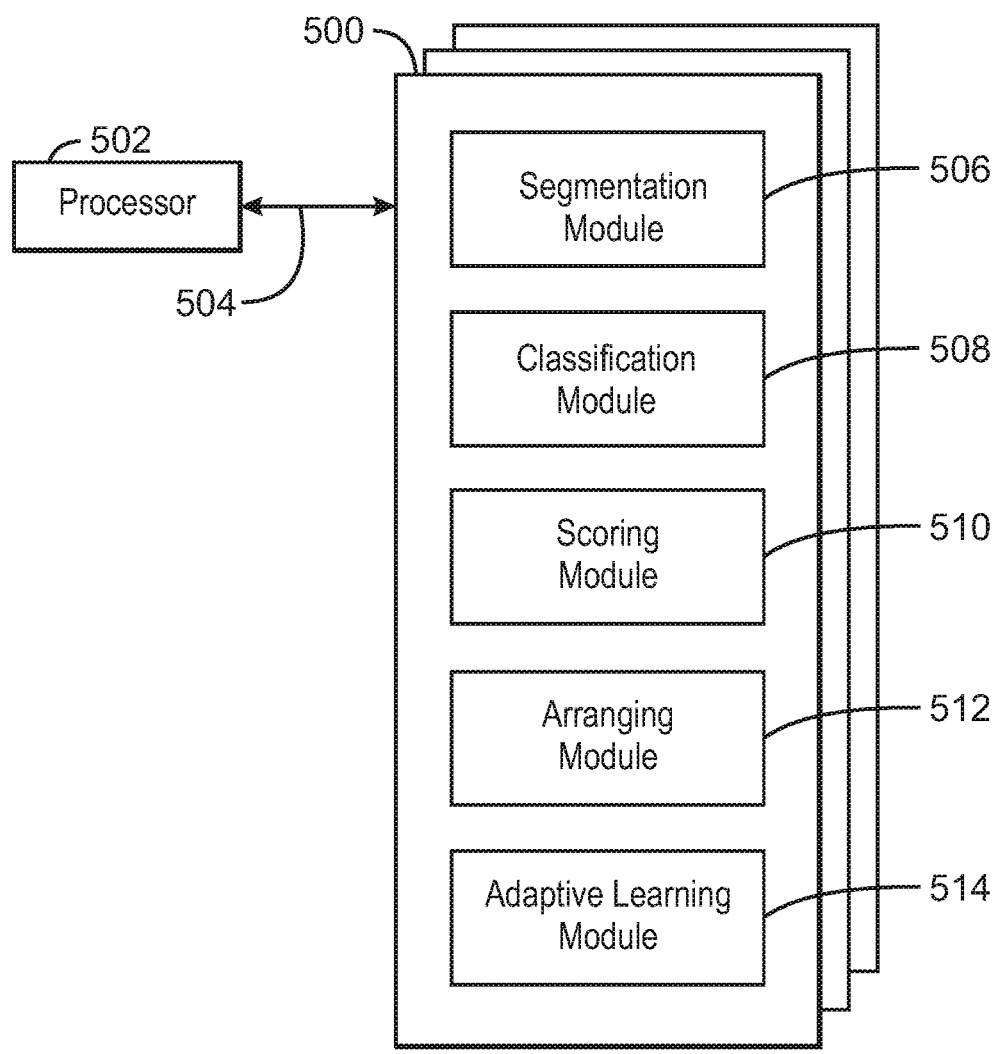
FIG. 5 is a block diagram showing a tangible, non-transitory computer-readable medium that stores instructions for a universal user-centric emotive autography arrangement.

FIG. 5 is a block diagram showing a tangible, non-transitory computer-readable medium that stores instructions for a universal user-centric emotive autography arrangement. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. A segmentation module 506 may be configured to segment multimedia data, which may be divided into semantically similar segments. A classification module 508 may be configured to generate classifiers dependent upon a preference of the user for an associated type of content. A scoring module 510 may be configured to generate a score for each segment. An arranging module 512 may be configured to arrange the segments dependent upon the preference scores. An adaptive learning module 514 is configured to change the identified classifiers over time. In this manner, the classifiers may be adaptively specific to a user. In embodiments, an emotive autograph is presented to a user based on the semantically similar segments arranged in the sequential order.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

Figure 6:
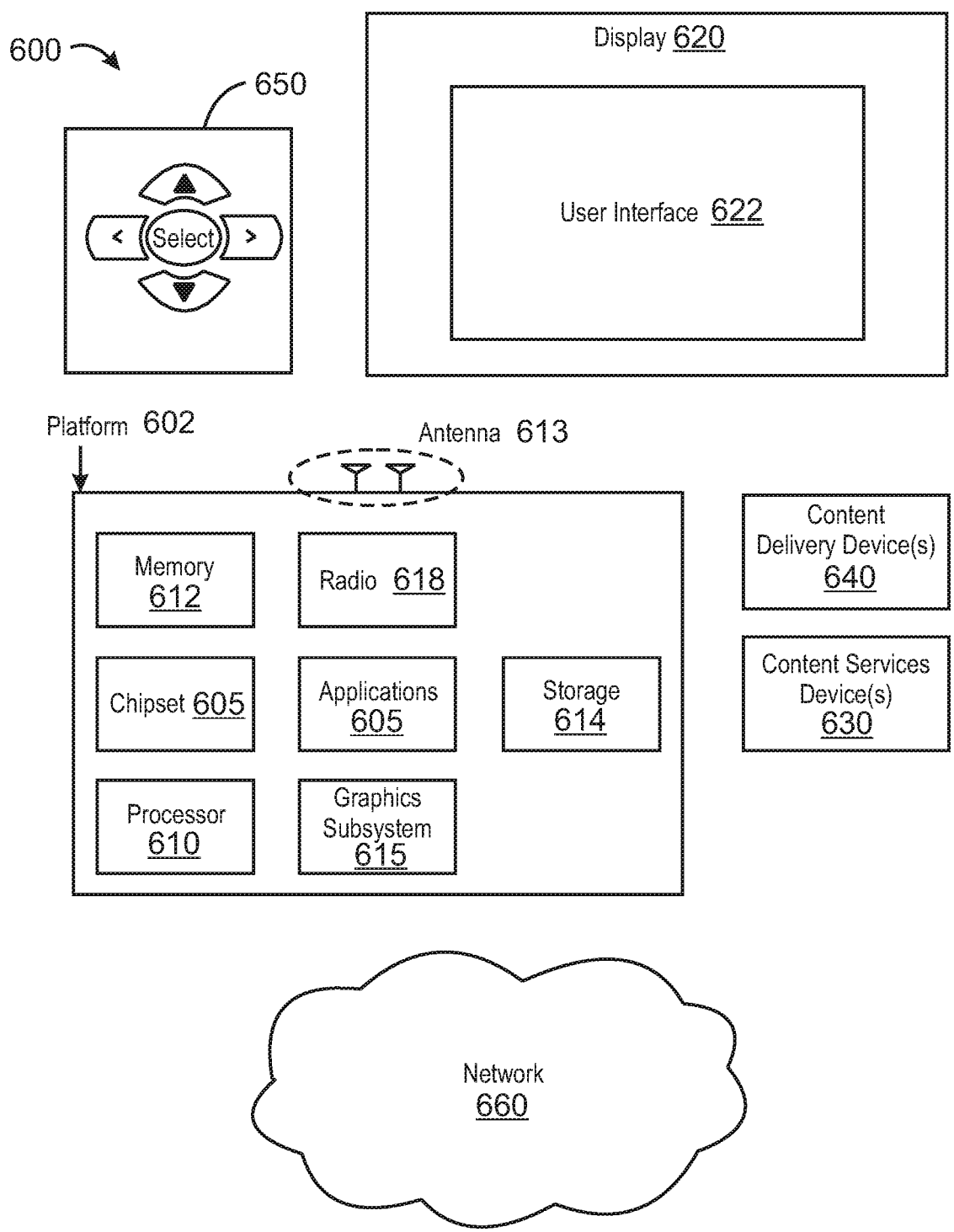
FIG. 6 is an illustrative diagram of an example system, arranged in accordance with at least some implementations of the present disclosure.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM). Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way. In various implementations, platform 602 may receive control signals from navigation controller 650 having one or more navigation features. The navigation features of controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the 6 computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 6.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
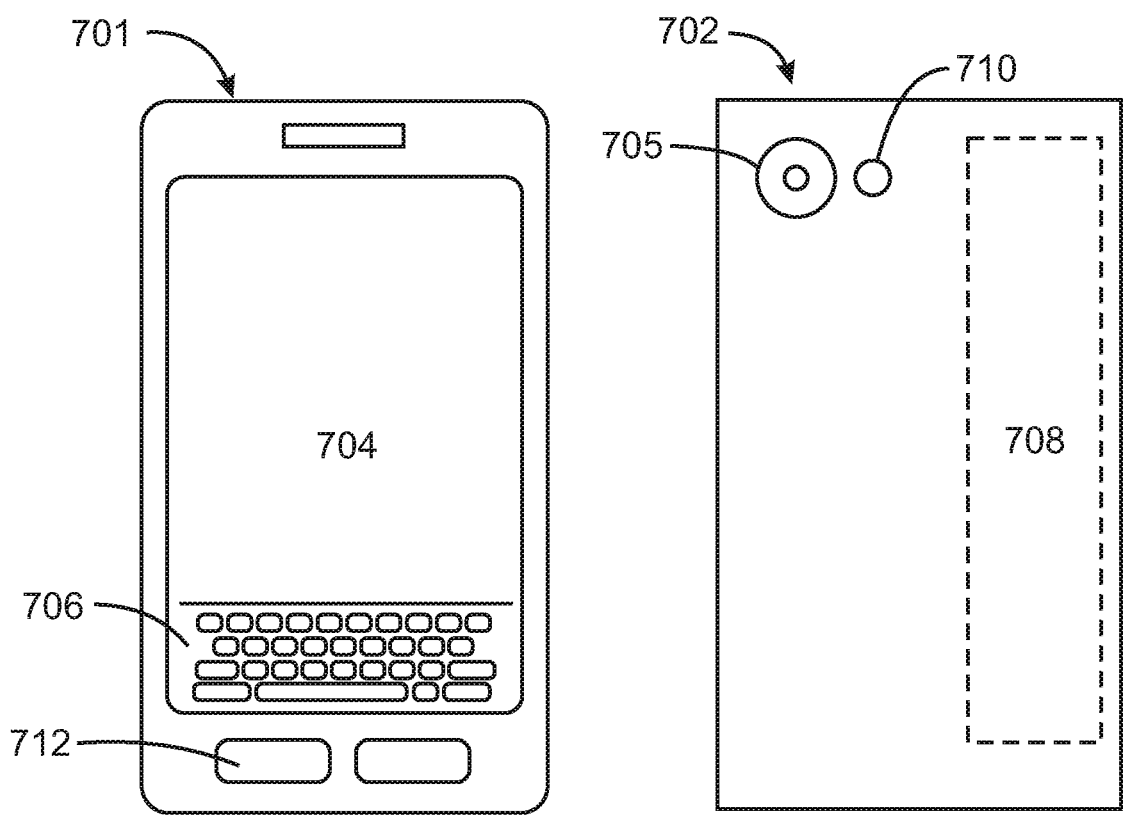
FIG. 7 illustrates an example small form factor device, arranged in accordance with at least some implementations of the present disclosure.

As described above, system 600 may be embodied in varying physical styles or form factors. FIG. 7 illustrates an example small form factor device 700, arranged in accordance with at least some implementations of the present disclosure. In some examples, system 600 may be implemented via device 700. In other examples, device 100 or portions thereof may be implemented via device 700. In various embodiments, for example, device 700 may be implemented as a mobile computing device a having wireless capabilities. A mobile computing device may refer to any device having a processing system and a mobile power source or supply, such as one or more batteries, for example. While FIG. 7 illustrates a small form factor device, the present techniques are not limited to small form factors or mobile phones. The present techniques may be used with any electronic device of any size.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing with a front 701 and a back 702. Device 700 includes a display 704, an input/output (I/O) device 706, and an integrated antenna 708. Device 700 also may include navigation features 712. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. As shown, device 700 may include a camera 705 (e.g., including a lens, an aperture, and an imaging sensor) and a flash 710 integrated into back 702 (or elsewhere) of device 700. In other examples, camera 705 and flash 710 may be integrated into front 701 of device 700 or both front and back cameras may be provided. Camera 705 and flash 710 may be components of a camera module to originate image data processed into streaming video that is output to display 704 and/or communicated remotely from device 700 via antenna 708 for example.

Example 1 is a method of emotive autography, the method. The method includes calculating a plurality of classifiers associated with an individual user, each of the classifiers indicating a preference of the user for an associated type of content; receiving data; dividing the data into semantically similar segments; assigning a respective preference score to each of the semantically similar segments by use of the classifiers; arranging the semantically similar segments in a sequential order, the arranging being performed dependent upon the preference scores; and presenting an emotive autograph based on the semantically similar segments arranged in the sequential order.

Example 2 includes the method of example 1, including or excluding optional features. In this example, the method includes the further step of using the semantically similar segments arranged in the sequential order to update the classifiers. Optionally, the updating of the classifiers includes receiving from the user selections of the segments. Optionally, the updating of the classifiers includes receiving from the user tags that the user has assigned to the segments.

Example 3 includes the method of any one of examples 1 to 2, including or excluding optional features. In this example, each of the classifiers quantifies the user's preferences regarding the content.

Example 4 includes the method of any one of examples 1 to 3, including or excluding optional features. In this example, the data is received from the individual user.

Example 5 includes the method of any one of examples 1 to 4, including or excluding optional features. In this example, the semantically similar segments are arranged in the sequential order dependent upon respective times at which the data was created.

Example 6 includes the method of any one of examples 1 to 5, including or excluding optional features. In this example, first ones of the classifiers are directed to content that the user likes and second ones of the classifiers are directed to content that the user dislikes.

Example 7 includes the method of any one of examples 1 to 6, including or excluding optional features. In this example, each segment is represented by a node on a graph, the method further comprising assigning weights to edges of the graph of nodes, each of the weights indicating a degree of similarity between a corresponding pair of the nodes.

Example 8 includes the method of any one of examples 1 to 7, including or excluding optional features. In this example, the content comprises multimedia or non-multimedia content.

Example 9 includes the method of any one of examples 1 to 8, including or excluding optional features. In this example, the data comprises video data, audio data, image data, data from sensors such as heart-rate, accelerometer, and global positioning system (GPS) sensors, or any combination thereof.

Example 10 is an emotive autography apparatus. The apparatus includes a selective supervised learning module configured to calculate a plurality of classifiers associated with an individual user, each of the classifiers indicating a preference of the user for an associated type of content; a segmentation module configured to divide received data into semantically similar segments; a segments classification and scoring module communicatively coupled to the segmentation module and to the selective supervised learning module, the segments classification and scoring module being configured to assign a respective preference score to each of the semantically similar segments by use of the classifiers; a segment sequencer communicatively coupled to the segments classification and scoring module and configured to arrange the semantically similar segments in a sequential order, the arranging being performed dependent upon the preference scores; and a blender module communicatively coupled to the segment sequencer and configured to present an emotive autograph based on the semantically similar segments arranged in the sequential order.

Example 11 includes the apparatus of example 10, including or excluding optional features. In this example, the apparatus includes an adaptive learner module communicatively coupled to the segment sequencer and configured to use the semantically similar segments arranged in the sequential order to update the classifiers. Optionally, the adaptive learner module is configured to receive from the user selections of the segments and use the selections in the updating of the classifiers. Optionally, the adaptive learner module is configured to receive from the user tags that the user has assigned to the segments and use the tags in the updating of the classifiers.

Example 12 includes the apparatus of any one of examples 10 to 11, including or excluding optional features. In this example, each of the classifiers quantifies the user's preferences regarding the content.

Example 13 includes the apparatus of any one of examples 10 to 12, including or excluding optional features. In this example, the segmentation module is configured to receive the data from the individual user.

Example 14 includes the apparatus of any one of examples 10 to 13, including or excluding optional features. In this example, the segment sequencer is configured to arrange the semantically similar segments in the sequential order dependent upon respective times at which the multimedia data was created.

Example 15 includes the apparatus of any one of examples 10 to 14, including or excluding optional features. In this example, first ones of the classifiers are directed to ME channels for the user and second ones of the classifiers are directed to negative channels for the user.

Example 16 includes the apparatus of any one of examples 10 to 15, including or excluding optional features. In this example, the segments classification and scoring module is configured to: represent each segment by a respective node on a graph; and assign weights to edges of the graph of nodes, each of the weights indicating a degree of similarity between a corresponding pair of the nodes.

Example 17 includes the apparatus of any one of examples 10 to 16, including or excluding optional features. In this example, the content comprises multimedia or non-multimedia content.

Example 18 includes the apparatus of any one of examples 10 to 17, including or excluding optional features. In this example, the data comprises video data, audio data, image data, data from sensors such as heart-rate, accelerometer, and global positioning system (GPS) sensors, or any combination thereof.

Example 19 is a method of creating an emotive autograph, the method. The method includes receiving a plurality of sets of data comprising video data, audio data, image data, or sensor data, each set of data being associated with a respective user; segmenting and clustering the data into clusters of semantically similar segments; tagging each of the clusters with a semantically meaningful tag; training a respective set of classifiers for each of the clusters for each of the users, the training being performed by use of the semantically meaningful tags; assigning a respective preference score to each of the semantically similar segments by use of the classifiers; arranging the semantically similar segments in a sequential order, the arranging being performed dependent upon the preference scores; and creating a presentation based on the semantically similar segments arranged in the sequential order.

Example 20 includes the method of example 19, including or excluding optional features. In this example, measuring semantically similar segments comprises: segmenting a plurality of data into a set of at least two segments; representing the at least two segments by a first vector and a second vector, respectively; assigning a first number and a second number for at least one pair of one coordinate from the first vector and one coordinate from the second vector, wherein the first number is less than the value of the coordinates from the respective pair; computing a third number by summing the product of the first number and the second number for the at least one pair; computing the first number to minimize the third number for the at least one pair; representing the at least two segments by the respective nodes on a graph; and assigning weights to edges of the graph of nodes, the weights being the computed minimum value of the third number for the at least two pair.

Example 21 includes the method of any one of examples 19 to 20, including or excluding optional features. In this example, the method includes the further step of using the semantically similar segments arranged in the sequential order to update the classifiers. Optionally, the updating of the classifiers includes receiving from the user selections of the segments. Optionally, the updating of the classifiers includes receiving from the user tags that the user has assigned to the segments.

Example 22 includes the method of any one of examples 19 to 21, including or excluding optional features. In this example, each of the classifiers quantifies a preference of the user for an associated type of multimedia or non-multimedia content.

Example 23 includes the method of any one of examples 19 to 22, including or excluding optional features. In this example, the data is received from the individual users.

Example 24 includes the method of any one of examples 19 to 23, including or excluding optional features. In this example, the semantically similar segments are arranged in the sequential order dependent upon respective times at which the multimedia data was created.

Example 25 includes the method of any one of examples 19 to 24, including or excluding optional features. In this example, first ones of the classifiers are directed to content that the user likes and second ones of the classifiers are directed to content that the user dislikes.

Example 26 includes the method of any one of examples 19 to 25, including or excluding optional features. In this example, each segment is represented by a node on a graph, the method further comprising assigning weights to edges of the graph of nodes, each of the weights indicating a degree of similarity between a corresponding pair of the nodes.

Example 27 is an emotive autography system. The system includes a concept discovery module configured to: receive a plurality of sets of data, each set of data being associated with a respective user; segment and cluster the data into clusters of semantically similar segments; a concept selection module communicatively coupled to the concept discovery module and configured to tag each of the clusters with a semantically meaningful tag; a selective supervised learning module communicatively coupled to the concept selection module and configured to train a respective set of classifiers for each of the clusters for each of the users, the training being performed by use of the semantically meaningful tags; a segments classification and scoring module communicatively coupled to the selective supervised learning module, the segments classification and scoring module being configured to assign a respective preference score to each of the semantically similar segments by use of the classifiers; a segment sequencer communicatively coupled to the segments classification and scoring module and configured to arrange the semantically similar segments in a sequential order, the arranging being performed dependent upon the preference scores; and a blender module communicatively coupled to the segment sequencer and configured to present an emotive autograph based on the semantically similar segments arranged in the sequential order.

Example 28 includes the system of example 27, including or excluding optional features. In this example, the system includes an adaptive learner module communicatively coupled to the segment sequencer and configured to use the semantically similar segments arranged in the sequential order to update the classifiers. Optionally, the adaptive learner module is configured to receive from the user selections of the segments and use the selections in the updating of the classifiers. Optionally, the adaptive learner module is configured to receive from the user tags that the user has assigned to the segments and use the tags in the updating of the classifiers.

Example 29 includes the system of any one of examples 27 to 28, including or excluding optional features. In this example, each of the classifiers quantifies the user's preferences regarding the content.

Example 30 includes the system of any one of examples 27 to 29, including or excluding optional features. In this example, the concept discovery module is configured to receive the multimedia data from the individual user.

Example 31 includes the system of any one of examples 27 to 30, including or excluding optional features. In this example, the segment sequencer is configured to arrange the semantically similar segments in the sequential order dependent upon respective times at which the multimedia data was created.

Example 32 includes the system of any one of examples 27 to 31, including or excluding optional features. In this example, first ones of the classifiers are directed to ME channels for the user and second ones of the classifiers are directed to negative channels for the user.

Example 33 includes the system of any one of examples 27 to 32, including or excluding optional features. In this example, the segments classification and scoring module is configured to: represent each segment by a respective node on a graph; and assign weights to edges of the graph of nodes, each of the weights indicating a degree of similarity between a corresponding pair of the nodes.

Example 34 is a tangible, non-transitory, computer-readable medium. The computer-readable medium includes instructions that direct the processor to calculate a plurality of classifiers associated with an individual user, each of the classifiers indicating a preference of the user for an associated type of content; divide received data into semantically similar segments; assign a respective preference score to each of the semantically similar segments by use of the classifiers; arrange the semantically similar segments in a sequential order, the arranging being performed dependent upon the preference scores; and present an emotive autograph based on the semantically similar segments arranged in the sequential order.

Example 35 includes the computer-readable medium of example 34, including or excluding optional features. In this example, the computer-readable medium includes the further step of using the semantically similar segments arranged in the sequential order to update the classifiers. Optionally, the updating of the classifiers includes receiving from the user selections of the segments. Optionally, the updating of the classifiers includes receiving from the user tags that the user has assigned to the segments.

Example 36 includes the computer-readable medium of any one of examples 34 to 35, including or excluding optional features. In this example, each of the classifiers quantifies the user's preferences regarding the content.

Example 37 includes the computer-readable medium of any one of examples 34 to 36, including or excluding optional features. In this example, the data is received from the individual user.

Example 38 includes the computer-readable medium of any one of examples 34 to 37, including or excluding optional features. In this example, the semantically similar segments are arranged in the sequential order dependent upon respective times at which the data was created.

Example 39 includes the computer-readable medium of any one of examples 34 to 38, including or excluding optional features. In this example, first ones of the classifiers are directed to content that the user likes and second ones of the classifiers are directed to content that the user dislikes.

Example 40 includes the computer-readable medium of any one of examples 34 to 39, including or excluding optional features. In this example, each segment is represented by a node on a graph, the computer readable medium further comprising assigning weights to edges of the graph of nodes, each of the weights indicating a degree of similarity between a corresponding pair of the nodes.

Example 41 includes the computer-readable medium of any one of examples 34 to 40, including or excluding optional features. In this example, the content comprises multimedia or non-multimedia content.

Example 42 includes the computer-readable medium of any one of examples 34 to 41, including or excluding optional features. In this example, the data comprises video data, audio data, image data, data from sensors such as heart-rate, accelerometer, and global positioning system (GPS) sensors, or any combination thereof.

Example 43 is an emotive autography apparatus. The apparatus includes instructions that direct the processor to a plurality of means to indicate a preference of a user, wherein the preference is associated with a type of content; a segmentation module configured to divide received data into semantically similar segments; a segments classification and scoring module communicatively coupled to the segmentation module and to the plurality of means to indicate the preference of a user, the segments classification and scoring module being configured to assign a respective preference score to each of the semantically similar segments by use of the plurality of means to indicate the preference of a user; a segment sequencer communicatively coupled to the segments classification and scoring module and configured to arrange the semantically similar segments in a sequential order, the arranging being performed dependent upon the preference scores; and a blender module communicatively coupled to the segment sequencer and configured to present an emotive autograph based on the semantically similar segments arranged in the sequential order.

Example 44 includes the apparatus of example 43, including or excluding optional features. In this example, the apparatus includes an adaptive learner module communicatively coupled to the segment sequencer and configured to use the semantically similar segments arranged in the sequential order to update the plurality of means to indicate the preference of the user. Optionally, the adaptive learner module is configured to receive from the user selections of the segments and use the selections in the updating of the plurality of means to indicate the preference of the user. Optionally, the adaptive learner module is configured to receive from the user tags that the user has assigned to the segments and use the tags in the updating of the plurality of means to indicate the preference of the user.

Example 45 includes the apparatus of any one of examples 43 to 44, including or excluding optional features. In this example, each of the plurality of means to indicate the preference of the user quantifies the user's preferences regarding the content.

Example 46 includes the apparatus of any one of examples 43 to 45, including or excluding optional features. In this example, the segmentation module is configured to receive the data from the individual user.

Example 47 includes the apparatus of any one of examples 43 to 46, including or excluding optional features. In this example, the segment sequencer is configured to arrange the semantically similar segments in the sequential order dependent upon respective times at which the multimedia data was created.

Example 48 includes the apparatus of any one of examples 43 to 47, including or excluding optional features. In this example, first ones of the plurality of means to indicate the preference of the user are directed to ME channels for the user and second ones of the plurality of means to indicate the preference of the user are directed to negative channels for the user.

Example 49 includes the apparatus of any one of examples 43 to 48, including or excluding optional features. In this example, the segments classification and scoring module is configured to: represent each segment by a respective node on a graph; and assign weights to edges of the graph of nodes, each of the weights indicating a degree of similarity between a corresponding pair of the nodes.

Example 50 includes the apparatus of any one of examples 43 to 49, including or excluding optional features. In this example, the content comprises multimedia or non-multimedia content.

Example 51 includes the apparatus of any one of examples 43 to 50, including or excluding optional features. In this example, the data comprises video data, audio data, image data, data from sensors such as heart-rate, accelerometer, and global positioning system (GPS) sensors, or any combination thereof.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of emotive autography, the method comprising:
   calculating a plurality of classifiers associated with an individual user, each of the classifiers indicating a preference of the user for an associated type of content;
   receiving data;
   dividing the data into semantically similar segments;
   assigning a respective preference score to each of the semantically similar segments by use of the classifiers;
   arranging the semantically similar segments in a sequential order, the arranging being performed dependent upon the preference scores; and
   presenting an emotive autograph based on the semantically similar segments arranged in the sequential order.

2. The method of claim 1, comprising the further step of using the semantically similar segments arranged in the sequential order to update the classifiers.

3. The method of claim 1, wherein an update of the classifiers includes receiving from the user selections of the segments.

4. The method of claim 1, wherein an update of the classifiers includes receiving from the user tags that the user has assigned to the segments.

5. The method of claim 1, wherein each of the classifiers quantifies the user's preferences regarding the content.

6. The method of claim 1, wherein the data is received from the individual user.

7. The method of claim 1, wherein the semantically similar segments are arranged in the sequential order dependent upon respective times at which the data was created.

8. The method of claim 1, wherein first ones of the classifiers are directed to content that the user likes and second ones of the classifiers are directed to content that the user dislikes.

9. The method of claim 1, wherein each segment is represented by a node on a graph, the method further comprising assigning weights to edges of the graph of nodes, each of the weights indicating a degree of similarity between a corresponding pair of the nodes.

10. The method of claim 1, wherein the content comprises multimedia or non-multimedia content.

11. The method of claim 1, wherein the data comprises video data, audio data, image data, data from sensors including heart-rate, accelerometer, or global positioning system (GPS) sensors, or any combination thereof.

12. An emotive autography apparatus, comprising:
a processor configured to execute:
a selective supervised learning module configured to calculate a plurality of classifiers associated with an individual user, each of the classifiers indicating a preference of the user for an associated type of content;
a segmentation module configured to divide received data into semantically similar segments;
a segments classification and scoring module communicatively coupled to the segmentation module and to the selective supervised learning module, the segments classification and scoring module being configured to assign a respective preference score to each of the semantically similar segments by use of the classifiers;
a segment sequencer communicatively coupled to the segments classification and scoring module and configured to arrange the semantically similar segments in a sequential order, the arranging being performed dependent upon the preference scores; and
a blender module communicatively coupled to the segment sequencer and configured to present an emotive autograph based on the semantically similar segments arranged in the sequential order.

13. The apparatus of claim 12, further comprising an adaptive learner module communicatively coupled to the segment sequencer and configured to use the semantically similar segments arranged in the sequential order to update the classifiers.

14. The apparatus of claim 12, wherein an adaptive learner module is configured to receive from the user selections of the segments and use the selections in the updating of the classifiers.

15. The apparatus of claim 12, wherein an adaptive learner module is configured to receive from the user tags that the user has assigned to the segments and use the tags in the updating of the classifiers.

16. The apparatus of claim 12, wherein each of the classifiers quantifies the user's preferences regarding the content.

17. An emotive autography system, comprising:
a processor configured to execute:
a concept discovery module configured to:
receive a plurality of sets of data, each set of data being associated with a respective user;
segment and cluster the data into clusters of semantically similar segments;
a concept selection module communicatively coupled to the concept discovery module and configured to tag each of the clusters with a semantically meaningful tag;
a selective supervised learning module communicatively coupled to the concept selection module and configured to train a respective set of classifiers for each of the clusters for each of the users, the training being performed by use of the semantically meaningful tags;
a segments classification and scoring module communicatively coupled to the selective supervised learning module, the segments classification and scoring module being configured to assign a respective preference score to each of the semantically similar segments by use of the classifiers;
a segment sequencer communicatively coupled to the segments classification and scoring module and configured to arrange the semantically similar segments in a sequential order, the arranging being performed dependent upon the preference scores; and
a blender module communicatively coupled to the segment sequencer and configured to present an emotive autograph based on the semantically similar segments arranged in the sequential order.

18. The system of claim 17, wherein the concept discovery module is configured to receive the multimedia data from the individual user.

19. The system of claim 17, wherein the segment sequencer is configured to arrange the semantically similar segments in the sequential order dependent upon respective times at which the multimedia data was created.

20. The system of claim 17, wherein first ones of the classifiers are directed to ME channels for the user and second ones of the classifiers are directed to negative channels for the user.

21. The system of claim 17, wherein the segments classification and scoring module is configured to:
represent each segment by a respective node on a graph; and
assign weights to edges of the graph of nodes, each of the weights indicating a degree of similarity between a corresponding pair of the nodes.

22. A tangible, non-transitory, computer-readable medium comprising instructions that, when executed by a processor, direct the processor to:
calculate a plurality of classifiers associated with an individual user, each of the classifiers indicating a preference of the user for an associated type of content;
divide received data into semantically similar segments;
assign a respective preference score to each of the semantically similar segments by use of the classifiers;
arrange the semantically similar segments in a sequential order, the arranging being performed dependent upon the preference scores; and
present an emotive autograph based on the semantically similar segments arranged in the sequential order.

23. The computer readable medium of claim 22, wherein each of the classifiers quantifies the user's preferences regarding the content.

24. The computer readable medium of claim 22, wherein the data is received from the individual user.

25. The computer readable medium of claim 22, wherein the semantically similar segments are arranged in the sequential order dependent upon respective times at which the data was created.

* * * * *